US012267615B2

(12) United States Patent
Tan et al.

(10) Patent No.: US 12,267,615 B2
(45) Date of Patent: Apr. 1, 2025

(54) SYSTEM AND METHOD FOR ESTABLISHING A DYNAMIC PRIVACY ZONE FOR AN OBJECT (71) Applicant: MOTOROLA SOLUTIONS, INC., Chicago, IL (US)

(72) Inventors: Chun Meng Tan, Bayan Lepas (MY); Mordechai Glick, Petaq Tiqua (IL); Lukasz Luczak, Skawina (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 217 days.

(21) Appl. No.: 18/068,062

(22) Filed: Dec. 19, 2022

(65) Prior Publication Data

US 2024/0205356 A1 Jun. 20, 2024

(51) Int. Cl.
*H04N 5/262* (2006.01)
*G06V 10/25* (2022.01)
*H04W 4/029* (2018.01)

(52) U.S. Cl.
CPC ........... *H04N 5/2621* (2013.01); *G06V 10/25* (2022.01); *H04W 4/029* (2018.02)

(58) Field of Classification Search
CPC ..... H04N 5/2621; G06V 10/25; H04W 4/029; G08B 13/19686
See application file for complete search history.

(56) References Cited

U.S. PATENT DOCUMENTS

| 10,445,956 | B2 | 10/2019 | Kamkar et al. |
| 10,839,492 | B2 | 11/2020 | Scott et al. |
| 11,031,044 | B1 | 6/2021 | Lee et al. |
| 2010/0182447 | A1* | 7/2010 | Namba ................ H04N 5/272 348/222.1 |
| 2016/0314259 | A1 | 10/2016 | Dudee et al. |
| 2018/0061010 | A1 | 3/2018 | Akselrod et al. |
| 2021/0256835 | A1 | 8/2021 | Ranasinghe et al. |

FOREIGN PATENT DOCUMENTS

EP 2157781 A1 2/2010

OTHER PUBLICATIONS

The International Search Report and the Written Opinion, corresponding patent application No. PCT/US2023/082238, filed: Dec. 4, 2023, mailed Apr. 3, 2024, all pages.

(Continued)

*Primary Examiner* — Nicholas G Giles
(74) *Attorney, Agent, or Firm* — Raguraman Kumaresan (57) ABSTRACT A system and method for establishing a dynamic privacy zone for an object. In operation, an electronic computing device receives a request from an electronic tag associated with an object to establish a dynamic privacy zone for the object. The request includes location data indicating a real-time location of the object. The electronic computing device identifies a camera having a field of view overlapping with the real-time location of the object. The electronic computing device converts the real-time location of the object into a corresponding pixel location on the field of view of the camera. The electronic computing device then establishes a dynamic privacy zone for the object within the field of view of the camera as a function of the corresponding pixel location.

16 Claims, 7 Drawing Sheets (56) References Cited

OTHER PUBLICATIONS

Avigilon, "Privacy Zones", ACC7 Privacy Zone, https://help.avigilon.com/acc/en/customizing-acc/display-settings/privacy-zones.htm, downloaded from internet: Dec. 12, 2022, all pages.
D. Palivcova, M. Macik and Z. Mikovec, "SuSy: Surveillance system for hospitals," 2017 8th IEEE International Conference on Cognitive Infocommunications (CogInfoCom), 2017, pp. 000131-000136, doi: 10.1109/CogInfoCom.2017.8268229.

* cited by examiner

SYSTEM AND METHOD FOR ESTABLISHING A DYNAMIC PRIVACY ZONE FOR AN OBJECT

BACKGROUND

Video surveillance systems are widely used for public and private safety measures. Many public and private organizations share images captured by their surveillance cameras with other organizations for investigation or record purposes. Such images frequently capture the identity of individuals whose privacy may need to be protected for safety and legal reasons.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, agencies often share images (still or moving images) owned/captured by them with other agencies for investigation or record purposes. Also, sometimes agencies release images captured by them on public platforms (e.g., social media, press etc.) to provide transparency into their investigation or to seek information about persons, objects, or events captured in the images. Such images often capture the identity of private individuals whose privacy may need to be protected for safety or legal reasons.

As an example, video solutions are deployed in many hospitals for the safety of patients and doctors as well as to monitor the treatment of patients. However, recording patients in hospitals can create potential privacy issues. While recording only in public areas of hospitals may help mitigate some of the legal risk associated with privacy issues, persons using the public areas may be still concerned about their privacy. Patients would be concerned about their privacy if there is a camera recording them while they are being transported in their hospital gowns through the public areas of the hospital. What is needed is a solution for users to request that they not be recorded in certain situations that they may compromise their privacy.

Accordingly, disclosed below is a technical solution to enable users concerned about their privacy to request a dynamic privacy zone to be established around them (or an object associated with them) as they move about in different locations where cameras may be positioned. The technical solution involves issuing users with electronic tags that are provisioned to automatically send signals to camera systems for establishing privacy zones around them. The cameras establishing a privacy zone for users may be instructed to refrain from recording the users while the users are present in their field of view. Optionally, even if images or videos are captured while the users were present in a field of view of a particular camera, the cameras may be instructed to redact those portions of the images or videos overlapping with the users' privacy zones.

A first embodiment provides a method for establishing a dynamic privacy zone for an object. The method comprises receiving, at an electronic computing device, a request from an electronic tag associated with an object to establish a dynamic privacy zone for the object, the request including location data indicating a real-time location of the object; responsive to the request, identifying, at the electronic computing device, a camera having a field of view overlapping with the real-time location of the object; converting, at the electronic computing device, the real-time location of the object into a corresponding pixel location on the field of view of the camera; and establishing, at the electronic computing device, a dynamic privacy zone for the object within the field of view of the camera as a function of the corresponding pixel location.

A second embodiment provides a system for establishing a dynamic privacy zone for an object. The system comprises a real-time location system (RTLS) configured to determine a real-time location of an object and a wireless transmitter configured to communicate a request including the real-time location of the object for establishing a privacy zone for the object within a field of view of a camera.

A third embodiment provides a method for establishing a dynamic privacy zone for an object. The method comprises receiving, at an electronic computing device, from at least two electronic tags, a request to establish a dynamic privacy zone, the request including location data indicating a first set of location coordinates associated with a first one of the at least two electronic tags and a second set of location coordinates associated with a second one of the at least two electronic tags; determining, from the request, that the first one of the at least two electronic tags and the second one of the at least two electronic tags are associated with a common object; responsive to the request, identifying, at the electronic computing device, a camera having a field of view overlapping with the first set of location coordinates and the second set of location coordinates; converting, at the electronic computing device, the first set of location coordinates and the second set of location coordinates into a first set of pixel coordinates and a second set of pixel coordinates, respectively, on the field of view of the camera; establishing, at the electronic computing device, a dynamic privacy zone for the object within the field of view of the camera as a geometric function of the first set of pixel coordinates and the second set of pixel coordinates.

Each of the above-mentioned embodiments will be discussed in more detail below, starting with example system and device architectures of the system in which the embodiments may be practiced, followed by an illustration of processing blocks for achieving an improved technical method, device, and system for establishing a dynamic privacy zone for an object. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
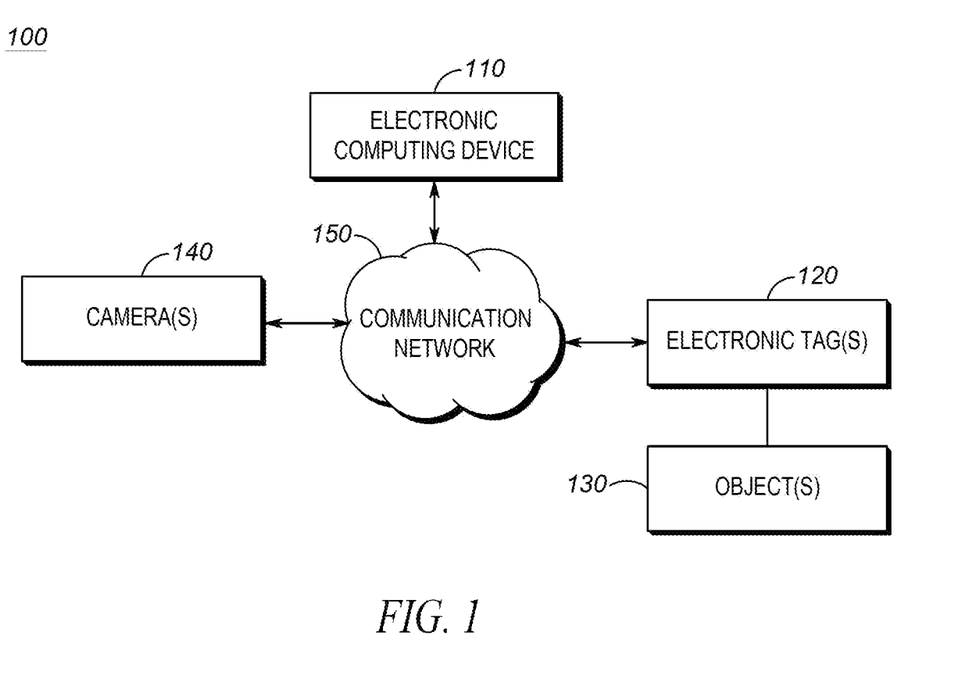
FIG. 1 is a block diagram of a system in accordance with some embodiments.

Referring now to the drawings, and in particular FIG. 1 illustrates a system 100 comprising an electronic computing device 110, one or more electronic tags 120 associated with one or more objects 130, one or more cameras 140, and one or more communication networks 150. The electronic computing device 110 is an on-prem device or a cloud computing device configured to establish, maintain, and update a dynamic privacy zone for an object 130 in response to signals received from an electronic tag 120 associated with the object 130. In one embodiment, one or more functions of the electronic computing device 110 are implemented at the cameras 140.

In accordance with some embodiments, the electronic tag 120 is a portable low-power battery-operated electronic communication device that is adapted to be carried by, attached to, or worn on an object 130. As used herein, the term "object" may represent a person (e.g., a patient), an animal, or a physical item (e.g., suitcase, bag, vehicle, jewelry, document, etc.) owned by or otherwise associated with a person. In one embodiment, the electronic tag 120 may be attached to another portable or mobile apparatus that follows, carries, or moves with a person or a physical item. For example, the portable or mobile apparatus may be a mobile device, a wheelchair, a robot, a transport stretcher, gurney, a vehicle, or any other device that follows, carries, or moves with a person or a physical item for which a dynamic privacy zone is to be established. The electronic tag 120 may also take the form of a privacy badge that is issued to a user requesting a dynamic privacy zone service.

In accordance with embodiments, the electronic tag 120 includes a real-time location system (RTLS) that is configured with one or more real-time location technologies for determining a real-time location of an object 130 to which the electronic tag 120 is associated. The RTLS includes, but is not limited to, one or more of a Wi-Fi positioning system, a radio-frequency identification (RFID) system, an ultra-wideband (UWB) system, an ultrasonic locationing system, a millimeter wave system, an infrared system, a bluetooth beacon indoor positioning system, a global positioning system (GPS), and any other system that is capable of detecting a real-time location of an object 130. The electronic tag 120 further includes a wireless transmitter that is configured to transmit a signal to one or more of the electronic computing device 110 or the cameras 140 to establish, maintain, or update a privacy zone for an object 130 to which the electronic tag 120 is associated. The request includes location data indicating a real-time location (e.g., X, Y, and Z coordinates, a particular indoor area, a facility address etc.) of the object 130. In accordance with some embodiments, as the object 130 moves with an associated electronic tag 120, the electronic tag 120 detects a real-time location of the object 130 using the RTLS and further periodically (or in response to a change in the location) sends the object's location to the electronic computing device 110 along with a request to establish, maintain, or update a dynamic privacy zone for the object 130. The electronic tag 120 further includes a memory that stores information related to an object 130 to which the electronic tag is associated. For example, the information may indicate whether a dynamic privacy zone service is enabled for the associated object 130. If the information stored in the memory of the electronic tag 120 indicates that the dynamic privacy zone service is activated, then the electronic tag 120 initiates a communication with the electronic computing device 110 to establish a dynamic privacy zone for the object. The information may also include predefined characteristics such as object width, object height, object shape, or object type of the object 130. In accordance with embodiments, the electronic tag 120 may share the predefined characteristics of the object 130 with the electronic computing device 110 to enable the electronic computing device 110 to customize the shape and size of the dynamic privacy zone to be established for the object 130. In one embodiment, the information stored in the memory of the electronic tag 120 may include a unique identifier of an object 130 to which the electronic tag 120 is associated. In one embodiment, the unique identifier of an object 130 may be stored in multiple electronic tags 120. In other words, multiple electronic tags 120 may be associated with the same object. In this embodiment, an electronic computing device 110 receiving the same object identifier from multiple electronic tags may determine that a dynamic privacy zone is to be established for a single object 130 by customizing the size and shape of the dynamic privacy zone according to information (e.g., location coordinates) received from each of the multiple electronic tags.

In accordance with some embodiments, before an electronic tag 120 can be used to initiate a request for establishing a dynamic privacy zone for an associated object 130, the electronic tag 120 is registered to share real-time locations of an associated object 130 with an electronic computing device 110 and to further request the electronic computing device 110 to establish a dynamic privacy zone for the object 130. As an example, assume a hospital administration decides to offer a dynamic privacy zone service to patients. In this case, patients who are concerned about their privacy i.e., being photographed or recorded by cameras deployed at the hospital, can request for an electronic tag 120 to be issued to them and to further activate a dynamic privacy zone service for them. When a patient requests for activating a privacy zone service, an electronic tag 120 is registered/associated with the patient by embedding a unique identifier of the patient within a memory of the electronic tag 120. Information associating the unique identifier of the patient to a device identifier of the electronic tag 120 that is issued to the patient is then stored in a database that is accessible by an electronic computing device 110 controlled by the hospital administration. The electronic tag 120 is then issued to the patient who may wear or carry the electronic tag 120. As the patient moves about different locations within the hospital, the electronic tag 120 acts as a proxy for the patient and shares real-time location of the patient with the electronic computing device 110 to enable the electronic computing device 110 to establish, maintain, and update a dynamic privacy zone for the patient. Once the dynamic privacy zone is established for the patient, a camera 140 controlled by the electronic computing device 110 and further having a field-of-view overlapping with the real-time location of the object 130 may receive instruction to refrain from recording an image or a video corresponding to an area where the patient is present. Alternatively, the camera 140 may receive an instruction to redact a portion of an image or a video captured corresponding to the patient prior to storing and/or streaming the image or the video.

The system 100 includes one or more cameras 140 that are configured to capture images corresponding to its field-of-view at different points in time. The cameras 140 may include, but not limited to, surveillance cameras, vehicle cameras, body-worn cameras, mobile device cameras, drone cameras that are deployed in an indoor or outdoor environment. As an example, the cameras 140 may be owned or operated by agencies (e.g., hospitals) that provide a dynamic privacy zone service for a user (e.g., user to whom electronic tag 120 is issued). In accordance with embodiments, the electronic computing device 110 is authorized to instruct only a predefined set of cameras 140 (e.g., cameras controlled by a particular agency which activated the dynamic privacy zone service for a user) to establish a dynamic privacy zone for the user.

The electronic computing device 110, the electronic tag 120, and the camera 140 may communicate with one another via the communication network 150. The communication network 150 comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VOIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

While only one electronic computing device 110, electronic tag 120, camera 140, and communication network 170 are shown in FIG. 1 for illustrative purposes, the system 100 may be implemented using any number of electronic computing devices, electronic tags, cameras, and communication networks.

Figure 2:
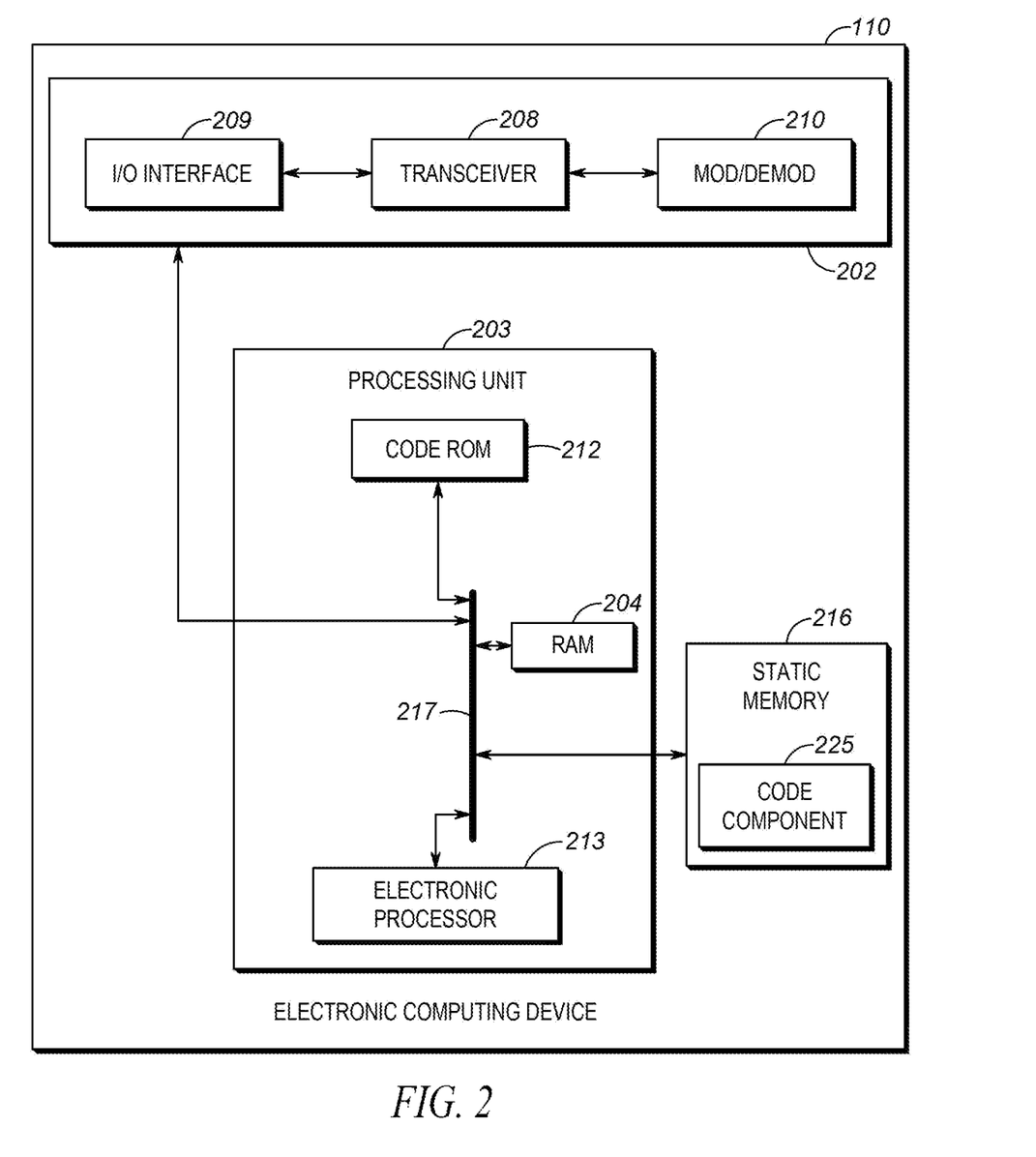
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). While FIG. 2 represents an electronic computing device 110 described above with respect to FIG. 1, depending on the type of server, the electronic computing device 110 may include fewer or additional components in configurations different from that illustrated in FIG. 2. In one embodiment, one or more of the functionalities may be implemented at the cameras 140. In these embodiments, the electronic tag 120 may be provisioned to communicate directly with the cameras 140 and further request cameras deployed in a particular location (e.g., hospital) to establish a dynamic privacy zone for an object 130 associated with the electronic tag 120.

As shown in FIG. 2, the electronic computing device 110 includes a communications unit 202 (also referred to as a "communication interface") coupled to a common data and address bus 217 of a processing unit 203. The communications unit 202 sends and receives data to and from other devices (e.g., electronic tags 120, cameras 140) in the system 100. The communications unit 202 may include one or more wired and/or wireless input/output (I/O) interfaces 209 that are configurable to communicate with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202.

Figure 3:
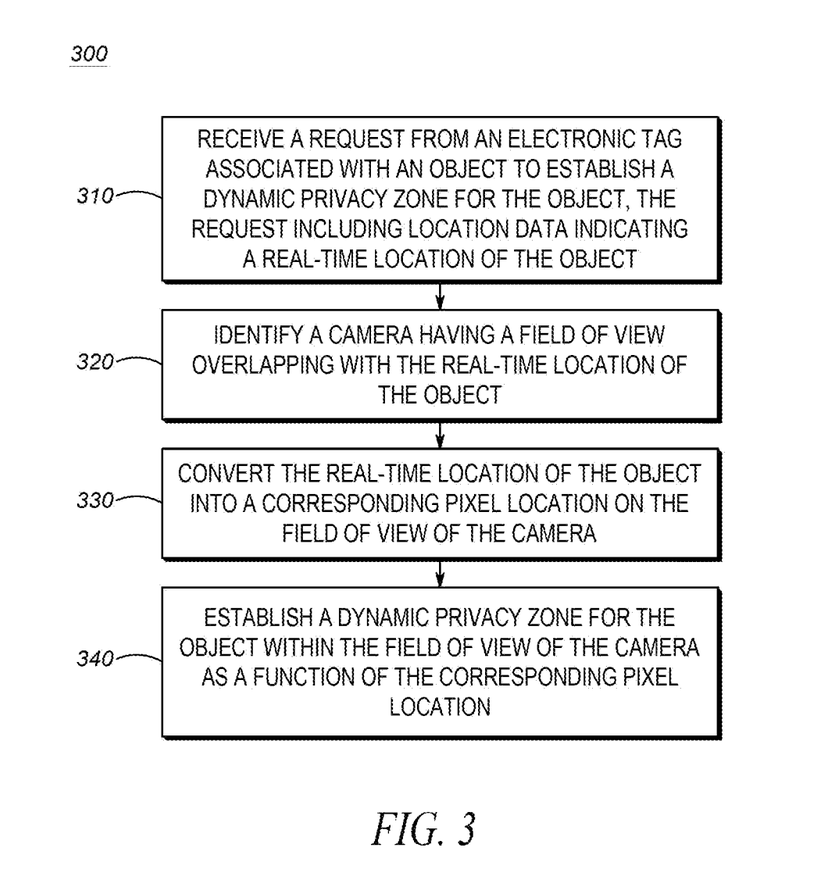
FIG. 3 illustrates a flowchart of a process for establishing a dynamic privacy zone for an object in accordance with some embodiments.

Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 216 may further store information needed for the electronic computing device 110 to: receive a request including location data indicating a real-time location of the object 130 from an electronic tag 120 associated with an object to establish a dynamic privacy zone for the object, identify a camera 140 having a field of view overlapping with the real-time location of object; convert the real-time location of the object 130 into a corresponding pixel location on the field of view of the camera 140, and establish a dynamic privacy zone for the object 130 within the field of view of the camera 140 as a function of the corresponding pixel location.

Turning now to FIG. 3, a flowchart diagram illustrates a process 300 for establishing a dynamic privacy zone for an object 130. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 213.

The electronic computing device 110 may execute the process 300 at power-on, at some predetermined periodic time period thereafter, in response to a trigger raised locally at the electronic computing device 110 via an internal process or via an input interface or in response to a trigger from an external system (e.g., electronic tag 120) to which the electronic computing device 110 is communicably coupled, among other possibilities. As an example, the electronic computing device 110 is programmed to automatically trigger execution of the process 300 in response to receiving a notification indicating that a dynamic privacy zone service is activated for one or more objects (e.g., patients).

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well. The process 300 will be described below with reference to the example scenarios shown in FIGS. 4A-4B.

At block 310, the electronic computing device 110 receives a request from an electronic tag 120 associated with an object 130 to establish a dynamic privacy zone for the object 130. The request includes location data indicating a real-time location of the object 130. In one embodiment, the electronic tag 120 itself can perform the localization and then transmit location data including the real-time location of the object 130. In another embodiment, the real-time location of the object 130 is determined at the electronic computing device 110 based on location data (e.g., radio frequency signals) received from the electronic tag 120. As an example, a receiver implemented at the electronic computing device 110) is configured to use a received signal strength indication, angle of arrival, time of arrival, and/or any other suitable parameter to determine a real-time location of the object 130.

In accordance with some embodiments, before the electronic computing device 110 proceeds to establish a dynamic privacy zone for the object 130, the electronic computing device 110 verifies whether a dynamic privacy zone service is enabled and activated for the object 130 to which the electronic tag 120 is associated. In these embodiments, the electronic computing device 110 retrieves a unique identifier (e.g., identifier of the object or the electronic tag) from the request received from the electronic tag 120. The electronic computing device 110 then compares the unique identifier with a list of pre-activated identifiers (i.e., identifiers of objects or electronic tags that were already activated for users) stored in a database. If the identifiers match, then the electronic computing device 110 determines that the dynamic privacy zone service is already activated for the object 130 and then proceeds to establish a dynamic privacy zone for the object 130 in accordance with the remainder of the process 300 described below. On the other hand, if the identifier received from the electronic tag 120 does not match with the list of pre-activated identifiers stored in the database, the electronic computing device 110 may not establish a dynamic privacy zone for the associated object 130. Optionally, in this case, the electronic computing device 110 may send an acknowledgment indicating that a dynamic privacy zone service is not yet activated for an object 130 associated with the electronic tag 120.

At block 320, the electronic computing device 110 identifies a camera 140 having a field of view overlapping with the real-time location of the object. In one embodiment, the electronic computing device 110 maintains a database (e.g., at the static memory 216) including information related to cameras 140 controlled or authorized to be instructed by the electronic computing device to establish privacy zones for objects 130. The information related to cameras 140 may include a unique identifier of a camera 140, a network address of a camera 140, a location at which the camera is deployed 140, and one or more configurations of the camera (e.g., camera's orientation, pan, tilt, or zoom) that can be used to determine the current field of view of the camera 140. As the cameras 140 may be mobile or fixed, the information related to the cameras 140 stored in the database is dynamically updated to enable the electronic computing device 110 to identify the current field of views of the cameras 140 that are located in proximity to the real-time location of the object 130. The electronic computing device 110 then identifies particular one or more cameras 140 with field of views respectively overlapping with the real-time location of the object 130. Accordingly, at block 320, the electronic computing device 110 may also identify multiple cameras 140 where each camera has a field of view overlapping or encompassing the real-time location of the object 130.

At block 330, the electronic computing device 110 converts the real-time location of the object 130 into a corresponding pixel location on the field of view of the camera 140. For example, the real-time location of the object 130 may be expressed in three-dimensional real-world coordinates. In this case, the electronic computing device 110 maps the three dimensional real-world location coordinates onto a corresponding pixel location on the camera's current field of view. The pixel location may identify a single pixel or multiple pixels in an image to be captured corresponding to a real-world location of the object 130. The electronic computing device 110 may use any suitable algorithm for converting the real-time location of the object 130 into a corresponding pixel location on the field of view of the camera 140.

At block 340, the electronic computing device 110 establishes a dynamic privacy zone for the object 130 within the field of view of the camera 140 as a function of the corresponding pixel location. In accordance with embodiments, the electronic computing device 110 may establish a dynamic privacy zone for the object by transmitting an instruction to the camera 140 identified as having a field of view overlapping with the real-time location of the object 130. In one embodiment, the electronic computing device 110 establishes a dynamic privacy zone for the object by instructing the camera 140 to refrain from capturing an image or a video during a time period when the object 130 remains at a location overlapped by the camera's field of view. In another embodiment, the electronic computing device 110 instructs the camera 140 to redact a portion of an image or a video captured corresponding to the dynamic privacy zone within the field of view of the camera 140. In response, the camera 140 redacts the pixels within the dynamic privacy zone before storing or streaming the captured image or video. In another embodiment, the redaction is performed by the electronic computing device 110 instead of at an edge device such as the camera 140. In this embodiment, the electronic computing device 110 has access to the images or video stored by the cameras 140. The electronic computing device 110 redacts the images or videos captured by cameras 140 during a time period when the camera's field of view overlapped with the locations of the object 130. In these embodiments, the camera 140 or the electronic computing device 110 may perform redaction by applying a redaction filter to image pixels contained in the dynamic privacy zone. Depending on the type of redaction filter, the pixel within the dynamic privacy zone of a captured image may be blurred, removed, or masked to ensure the anonymity of the object 130. As an example, the redaction filter may modify optical characteristics (e.g., by reducing the optical intensity) of one or more pixel values to which the filter is applied. The modification of optical characteristics may make the pixels contained in the dynamic privacy zone more coherent and less distinct, resulting in a redacted image. Alternatively, the redaction may involve removing pixel values within the dynamic privacy zone.

In accordance with some embodiments, the instruction provided by the electronic computing device 110 to the cameras 140 includes further information that will allow the camera 140 to customize a size and/or shape of the dynamic privacy zone in which the object 130 is expected to appear within an image or a video captured corresponding to the object's real-time location. For example, the instruction may include a pixel location identifying one or more pixels in the field of view of the camera 140 that directly maps to the real-world location of the object 130. In response to receiving the instruction from the electronic computing device 110, the cameras 140 customize a size and/or a shape of the dynamic privacy zone using the pixel location. In accordance with some embodiments, the size and/or shape of the privacy zone is determined based on a predefined characteristic of a particular object 130 for which a dynamic privacy zone is established.

In accordance with some embodiments, the electronic tag 120 is provisioned with information about one or more predefined characteristics of the associated object. The predefined characteristics may include one or more of: object type, object shape, object height, and object width. In these embodiments, when the electronic tag 120 sends an initial request to the electronic computing device 110 to establish a dynamic privacy zone. The initial request may include one or more of the predefined characteristics along with an indication to customize the size and/or shape of the privacy zone for the object 130 in accordance with the one or more of the predefined characteristics included in the request. In response, the electronic computing device 110 customizes a dynamic privacy zone for the object 130 in accordance with the predefined characteristics of the object. As an example, the electronic computing device 110 may instruct the camera 140 to define a rectangular privacy zone, such that, the height and width of the privacy zone matches the object's height and width specified in the request received from the electronic tag 120. In one embodiment, the pixel location containing one or more of the pixels identified at block 330 is positioned at the center of the dynamic privacy zone.

In accordance with some embodiments, the instruction provided by the electronic computing device 110 to the cameras 140 to establish a privacy zone for an object 130 may further include information specifying which portion of the object 130 is to be redacted. For example, a request received from the electronic tag 120 to establish a privacy zone for the object 120 may further specify which portion or portions (e.g., face, vehicle license plate) of the object 130 should be redacted. In response to the request, the electronic computing device 110 identifies a camera 110 that has a field of view overlapping with the real-time location of the object 120 and further sends an instruction to the camera 110 to redact the specified portion (e.g., face of the person) of the object 130 captured in an image corresponding to the real-time location of the object 130.

The electronic tag 120 may receive an acknowledgment from the electronic computing device indicating that a dynamic privacy zone is established for the object 130 to which the electronic tag 120 is associated. In accordance with embodiments, the electronic tag 120 continues to transmit signals including location data indicating real-time locations of the object 130 to the electronic computing device 110 to enable the electronic computing device 110 to maintain or update the dynamic privacy zone established for the object 130 in response to a change in the object's location. The electronic tag 120 may transmit the signals including object's location data either periodically or only when there is a change in the object's location. In these embodiments, the electronic tag 120 includes the predefined characteristics and the indication to customize the privacy zone only in the initial request transmitted to the electronic computing device 110 to establish a dynamic privacy zone for the object 130, but not in subsequent signals transmitted to the electronic computing device 110 to maintain or update the dynamic privacy zone.

In accordance with some embodiments, after a privacy zone is established for a particular object 130, the electronic computing device 110 continues to maintain or update the dynamic privacy zone for the object 130 unless the object 130 moves to a location where there is no camera coverage or when a request is received from the electronic tag 120

(e.g., in response to a request from a user) to remove the dynamic privacy zone established for the object 130.

In accordance with embodiments, when the electronic computing device 110 receives, from the electronic tag 120, further location data indicating a change in the real-time location of the object 130, the electronic computing device 110 determines whether the field of view of the camera 140 continues to overlap with the changed real-time location of the object 130. If the field of view overlaps with the changed real-time location of the object 130, then the electronic computing device 110 converts the changed real-time location of the object 130 into a corresponding changed pixel location on the field of view of the camera 140. The electronic computing device then updates the dynamic privacy zone for the object 130 within the field of view of the camera 140 as a function of the corresponding changed pixel location. On the other hand, if the field of view of the camera 140 does not overlap with the changed real-time location of the object 130, then the electronic computing device 110 may remove the established privacy zone for the object 130. The electronic computing device 110 may further instruct the camera 140 to no longer redact or alternatively refrain from capturing an image or a video captured corresponding to the previously established privacy zone within the field of view of the camera 140. In this case, even though the camera 140 no longer has a field of view to the changed real-time location of the object 130, the changed real-time location of the object 130 may now be overlapped by a second camera. Accordingly, the electronic computing device 110 converts the changed real-time location of the object 130 into a corresponding pixel location on the field of view of the second camera and further establishes an updated dynamic privacy zone for the object with the field of view of the second camera as a function of the pixel location. In this case, the electronic computing device 110 repeats the execution of blocks 320, 330, and 340 to update a dynamic privacy zone for the object 130 each time the electronic computing device 110 receives a signal from the electronic tag 120 indicating a change in the real-location of the object 130.

Figure 4A:
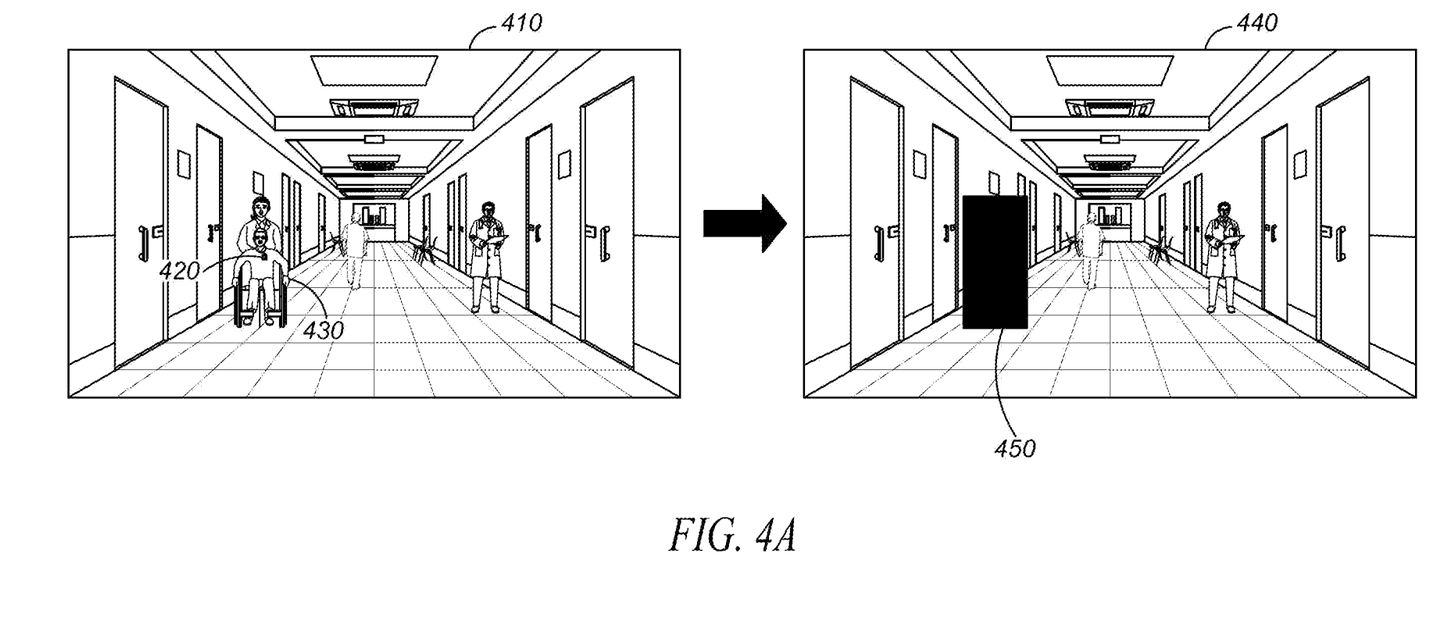
FIGS. 4A-4B illustrate an example scenario in which the embodiments described herein can be advantageously implemented for establishing a dynamic privacy zone for an object in accordance with some embodiments.
Figure 4B:
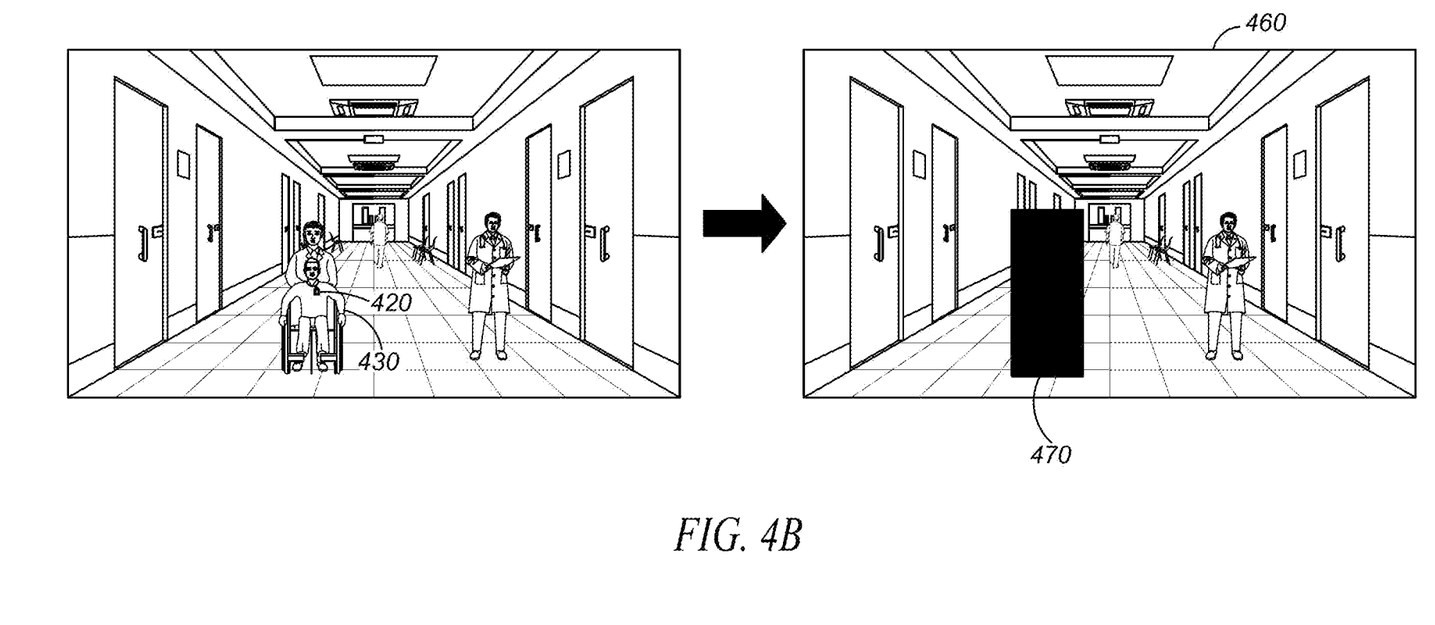

FIGS. 4A and 4B illustrate an example user environment in which a dynamic privacy zone can be established for a user in accordance with the process 300 described with reference to FIG. 3. In FIG. 4A, an image 410 capturing a patient 430 being transported in a wheelchair in a hospital is shown. Assume the image 410 represents an image captured by a camera 140 when a privacy zone service is not yet activated for the patient 430. Since a privacy zone service is not activated for the patient 430, no dynamic privacy zone is established for the patient 430. Accordingly, the image 410 is captured by the camera 140 without redacting any portion of the image 410 showing the patient 430. On the other hand, an image 440 is shown representing an image captured by a camera when a privacy zone service is activated for the patient 430 to address the privacy concerns of the patient 430. In this case, since a privacy zone service is activated for the patient 430, an electronic tag 420 issued to the patient 430 initiates a process 300 to establish a dynamic privacy zone for the patient 430. A dynamic privacy zone 450 is then established for the patient 430 in accordance with the execution of the process 300 by an electronic computing device 110. Accordingly, the dynamic privacy zone 450 defined within the image 440 corresponds to a real-time location of the patient 430 as reported by the electronic tag 420. In the example shown in FIG. 4A, the pixels within the dynamic privacy zone 450 of the image 440 are accordingly redacted using a suitable redaction filter (e.g., redaction mask) to ensure the anonymity of the patient 430.

As the patient 430 is being transported in the wheelchair, it is important for the patient's privacy zone to be updated based on the change in real-time location of the patient 430. This scenario is illustrated in FIG. 4B, where an image 460 with an updated dynamic privacy zone 470 is shown. The updated dynamic privacy zone 470 is generated in response to a change in the patient's location as reported by the electronic tag 420 worn by the patient 430. The updated dynamic privacy zone 470 is similarly redacted to ensure that the patient remains anonymous even as the patient moves to a different location that may be covered by the same or a different camera.

Figure 5:
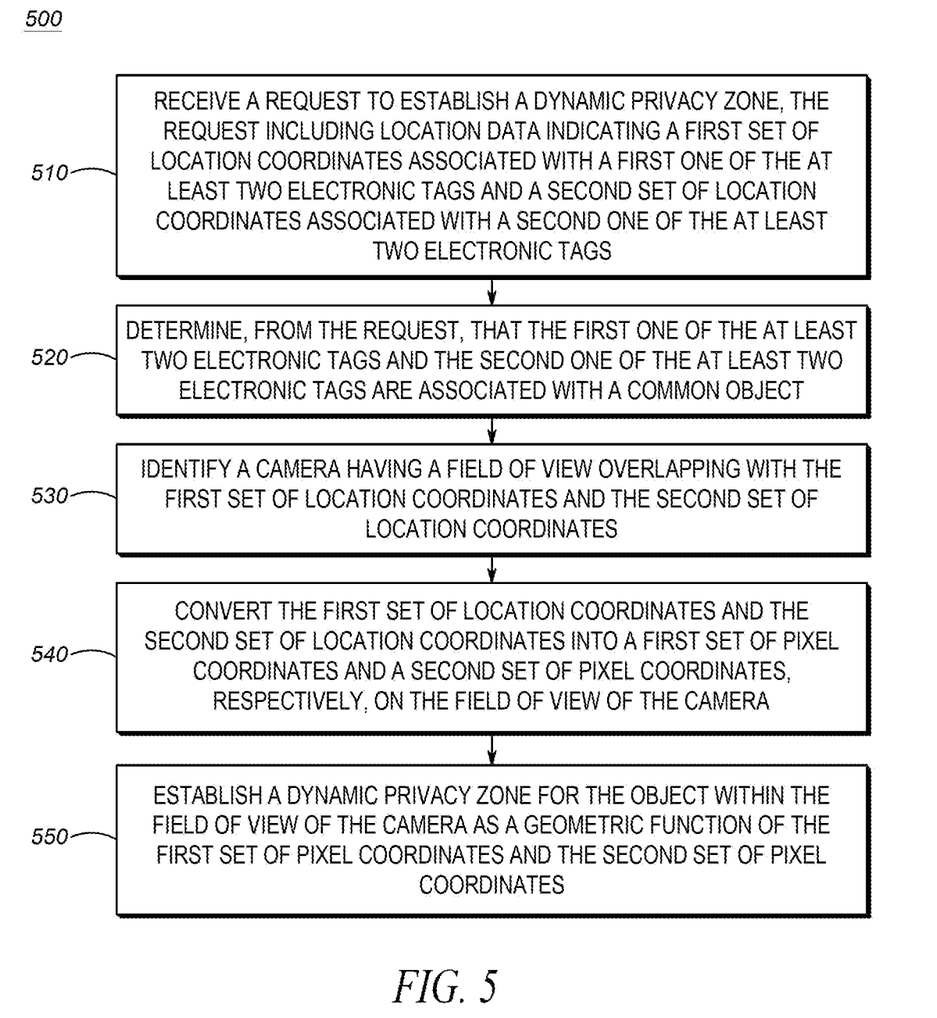
FIG. 5 illustrates a flowchart of another process for establishing a dynamic privacy for an object in accordance with some embodiments.

Turning now to FIG. 5, a flowchart diagram illustrates a process 500 for establishing a dynamic privacy zone for an object. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 500 via an electronic processor 213.

The electronic computing device 110 may execute the process 500 at power-on, at some predetermined periodic time period thereafter, in response to a trigger raised locally at the electronic computing device 110 via an internal process or via an input interface or in response to a trigger from an external system (e.g., electronic tag 120) to which the electronic computing device 110 is communicably coupled, among other possibilities. As an example, the electronic computing device 110 is programmed to automatically trigger execution of the process 500 in response to receiving a notification indicating that a dynamic privacy zone service is activated for one or more objects (e.g., patients).

The process 500 of FIG. 5 need not be performed in the exact sequence as shown and likewise various blocks may be performed in different order or alternatively in parallel rather than in sequence. The process 500 may be implemented on variations of the system 100 of FIG. 1 as well. The process 500 will be described below with reference to the example scenario shown in FIG. 6.

In accordance with some embodiments, a single object 130 may be associated with multiple electronic tags 120 to facilitate the electronic computing device 110 or the cameras 140 to define the size and/or shape of a dynamic privacy zone established for the object 130. In other words, in these embodiments, multiple electronic tags or privacy badges 120 may be pre-grouped/provisioned with a common object identifier to establish a dynamic privacy zone for a single object.

At block 510, the electronic computing device 110 receives a request to establish a dynamic privacy zone from multiple electronic tags 120. In the example shown in FIG. 6, the electronic computing device 110 receives a first request from a first electronic tag 620-1. The first request includes location data indicating a first set of location coordinates (x1, y1) associated with the first electronic tag 620-1. The electronic computing device 110 further receives a second request from a second electronic tag 620-2. The second request includes location data indicating a second set of location coordinates (x2, y2) associated with the second electronic tag 620-2. In one embodiment, the electronic computing device 110 proceeds to execute block 520 of the process 500 only if a request (i.e., second request) is received from an electronic tag within a predefined time duration from receiving a prior request (i.e., first request). If the second request is not received within the predefined time duration from receiving the first request, then the electronic computing device 110 considers the first and second requests as separate requests and therefore establishes a separate dynamic privacy zone in response to the respective requests in accordance with the process 300 shown in FIG. 3. On the other hand, if multiple requests are received within the predefined time duration, then the electronic computing device 110 proceeds to block 520 to determine whether they are associated with the same object.

At block 520, the electronic computing device 110 determines whether the two electronic tags 620-1, 620-2 are associated with the same object. In one embodiment, the requests received from the respective electronic tags 620-1, 620-2 include a unique identifier of an object (e.g., patient 630) to which the electronic tags 620-1, 620-2 are associated. If the identifiers included in the first request received from the first electronic tag 620-1 and the second electronic tag 620-2 match, then the electronic computing device 110 determines that the first and second electronic tags 620-1, 620-2 are associated with a common object (i.e., patient 630). Alternatively, if the identifiers do not match, then the electronic computing device 110 considers the first and second requests as separate requests received from tags associated with different objects. In this case, the electronic computing device 110 establishes separate dynamic privacy zones in response to the respective requests in accordance with the process 300 shown in FIG. 3.

Next, at block 530, the electronic computing device 110 identifies a camera 140 having a field of view overlapping with the first set of location coordinates and the second set of location coordinates. If the camera 140 overlaps with only one of the first and second sets of location coordinates, then the electronic computing device 110 may execute blocks 330 and 340 of the process 300 (see FIG. 3) to establish a dynamic privacy zone based on the location coordinates that are overlapped by the camera's field of view. As an example, in this case, the electronic computing device 110 may use the predefined characteristics of the object to customize the height and width of a dynamic privacy zone to be established for the associated object. In another embodiment, the electronic computing device 110 may define the shape of a privacy zone using the object shape as well as a geometrical distance between the first set of location coordinates (x1, y1) and the second set of location coordinates (x2, y2). As an example, the electronic computing device 110 may define a trapezoidal dynamic privacy zone for the object based on the geometrical distance between the first and second set of location coordinates. Accordingly, in this example, when only one set of location coordinates is overlapped by the camera's field of view, the electronic computing device 110 may define a dynamic privacy zone in the form of a trapezoid shape within the camera's field of view as determined from pixel coordinates corresponding to the set of location coordinates which are overlapped by the camera's field of view. In another example, when only one set of location coordinates overlaps with a field of view of a camera, the electronic computing device 110 may share the geometrical distance between the first and second set of location coordinates with a second camera such that when one electronic tag (e.g., electronic tag 620-2) enters the field of view of the second camera, the second camera can automatically use the geometrical distance between the first and second set of location coordinates to define a trapezoidal privacy zone for the object.

Next at block 540, when the electronic computing device 110 identifies that a camera 140 has a field of view overlapping with the first and second sets of the location coordinates received respectively from the first and second electronic tags 620-1, 620-2, the electronic computing device 110 converts the first set of location coordinates and the second set of location coordinates into a first set of pixel coordinates and a second set of pixel coordinates, respectively, on the field of view of the camera 140.

At block 550, the electronic computing device 110 establishes a dynamic privacy zone for the object within the field of view of the camera 140 as a geometric function of the first set of pixel coordinates and the second set of pixel coordinates. As an example, the electronic computing device 110 may determine that the first and second set of pixel coordinates form a trapezoid shape. In this example, the electronic computing device 110 may accordingly instruct the camera 140 to establish a dynamic privacy zone in the form of a trapezoidal shape. In response, the camera 140 will redact the pixels contained within the trapezoidal dynamic privacy zone of the camera's field of view.

Figure 6:
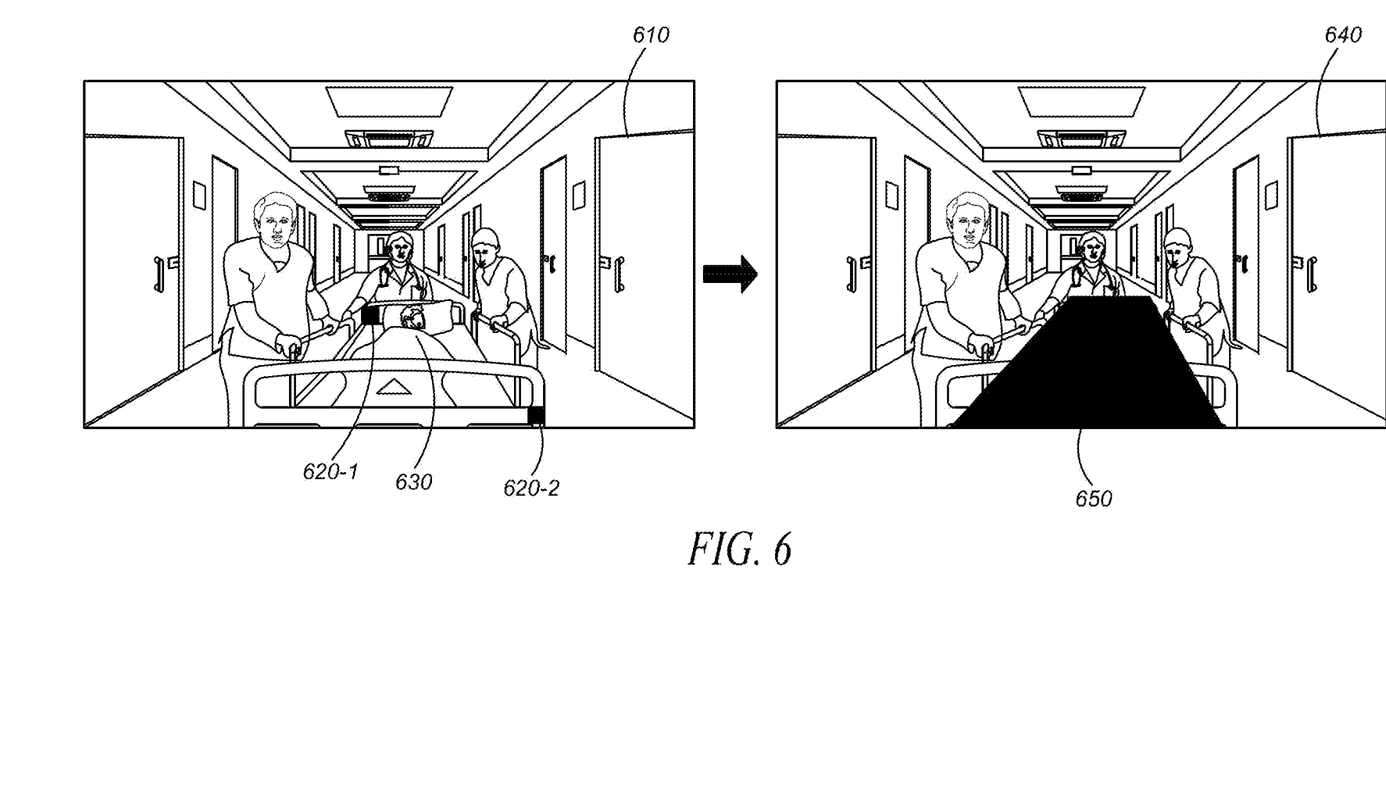
FIG. 6 illustrates another example scenario in which the embodiments described herein can be advantageously implemented for establishing a dynamic privacy zone for an object in accordance with some embodiments.

FIG. 6 illustrates an example user environment in which a dynamic privacy zone can be established for a user in accordance with the process 500 described with reference to FIG. 5. In FIG. 6, an image 610 is shown with a patient 630 being transported in a stretcher. However, in this example, the electronic tag is not worn by or attached to the patient. Instead, two electronic tags 620-1 and 620-2 are shown attached to a portable apparatus (i.e., stretcher) that carries the person 630. Further, in this example, assume the image 610 represents an image captured by a camera when a privacy zone service is not yet activated for the patient 630. Since a privacy zone service is not activated for the patient 630, no dynamic privacy zone is established for the patient 630. Accordingly, the image 610 is captured by the camera 140 without redacting any portion of the image 610 showing the patient 630. On the other hand, an image 640 is shown representing an image captured by a camera 140 when a privacy zone service is activated for the patient 630. In this case, since a privacy zone service is activated for the patient 630, electronic tags 620-1, 620-1 issued to the patient 630 and attached in a transport stretcher that carries the patient 630 initiate a process 500 to establish a dynamic privacy zone for the patient 630. A dynamic privacy zone 650 is then established for the patient 630 in accordance with the process 500 by an electronic computing device 110. In the example shown in FIG. 6, the pixels within the dynamic privacy zone 650 of the image 640 are accordingly redacted to ensure the anonymity of the patient 630.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for establishing a dynamic privacy zone for an object, the method comprising:
   receiving, at an electronic computing device, from at least two electronic tags, a request to establish a dynamic privacy zone, the request including location data indicating a first set of location coordinates associated with a first one of the at least two electronic tags and a second set of location coordinates associated with a second one of the at least two electronic tags;
   determining, from the request, that the first one of the at least two electronic tags and the second one of the at least two electronic tags are associated with a common object;
   responsive to the request, identifying, at the electronic computing device, a camera having a field of view overlapping with the first set of location coordinates and the second set of location coordinates;
   converting, at the electronic computing device, the first set of location coordinates and the second set of location coordinates into a first set of pixel coordinates and a second set of pixel coordinates, respectively, on the field of view of the camera; and
   establishing, at the electronic computing device, a dynamic privacy zone for the object within the field of view of the camera as a geometric function of the first set of pixel coordinates and the second set of pixel coordinates.

2. The method of claim 1, wherein establishing comprises:
   instructing the camera to redact an image or video captured corresponding to the privacy zone within the field of view of the camera.

3. The method of claim 1, further comprising:
   receiving a first object identifier of an object to which the first one of the at least two electronic tags is associated; and
   receiving a second object identifier of an object to which the second one of the at least two electronic tags is associated.

4. The method of claim 3, further comprising:
   determining that the first one of the at least two electronic tags and the second one of the at least two electronic tags are associated with the common object when the first object identifier matches with the second object identifier.

5. The method of claim 1, further comprising:
   determining that the request includes an indication to customize the privacy zone in accordance with one or more predefined characteristics of the object.

6. The method of claim 5, wherein the one or more predefined characteristics of the object includes one or more of: object type, object shape, object height, and object width.

7. The method of claim 5, wherein establishing comprises:
   customizing the dynamic privacy zone established for the object within the field of view of the camera as a function of the first set of pixel coordinates, the second set of pixel coordinates, and the one or more predefined characteristics.

8. The method of claim 5, wherein the one or more predefined characteristics of the object are included in the request received from the at least two electronic tags.

9. An electronic computing device, comprising:
   a communication interface; and
   an electronic processor communicatively coupled to the communication interface, the electronic processor configured to:
      receive, via the communication interface, from at least two electronic tags, a request to establish a dynamic privacy zone, the request including location data indicating a first set of location coordinates associated with a first one of the at least two electronic tags and a second set of location coordinates associated with a second one of the at least two electronic tags;
      determine, from the request, that the first one of the at least two electronic tags and the second one of the at least two electronic tags are associated with a common object;
      identify a camera having a field of view overlapping with the first set of location coordinates and the second set of location coordinates;
      convert the first set of location coordinates and the second set of location coordinates into a first set of pixel coordinates and a second set of pixel coordinates, respectively, on the field of view of the camera; and
      establish a dynamic privacy zone for the object within the field of view of the camera as a geometric function of the first set of pixel coordinates and the second set of pixel coordinates.

10. The electronic computing device of claim 9, wherein the electronic processor is configured to:
    instruct, via the communication interface, the camera to redact an image or video captured corresponding to the privacy zone within the field of view of the camera.

11. The electronic computing device of claim 9, wherein the electronic processor is configured to:
    receive, via the communication interface, a first object identifier of an object to which the first one of the at least two electronic tags is associated; and
    receive, via the communication interface, a second object identifier of an object to which the second one of the at least two electronic tags is associated.

12. The electronic computing device of claim 11, wherein the electronic processor is configured to:
    determine that the first one of the at least two electronic tags and the second one of the at least two electronic tags are associated with the common object when the first object identifier matches with the second object identifier.

13. The electronic computing device of claim 9, wherein the electronic processor is configured to:
    determine that the request includes an indication to customize the privacy zone in accordance with one or more predefined characteristics of the object.

14. The electronic computing device of claim 13, wherein the one or more predefined characteristics of the object includes one or more of: object type, object shape, object height, and object width.

15. The electronic computing device of claim 13, wherein the electronic processor is configured to:
    customize the dynamic privacy zone established for the object within the field of view of the camera as a function of the first set of pixel coordinates, the second set of pixel coordinates, and the one or more predefined characteristics.

16. The electronic computing device of claim 13, wherein the one or more predefined characteristics of the object are included in the request received from the at least two electronic tags.

* * * * *